July 6, 1948.  A. LYSHOLM  2,444,456
SUPERCHARGING SYSTEM FOR INTERNAL-COMBUSTION ENGINES
Filed Aug. 19, 1943  3 Sheets-Sheet 2

INVENTOR
Alf Lysholm
BY
his ATTORNEY

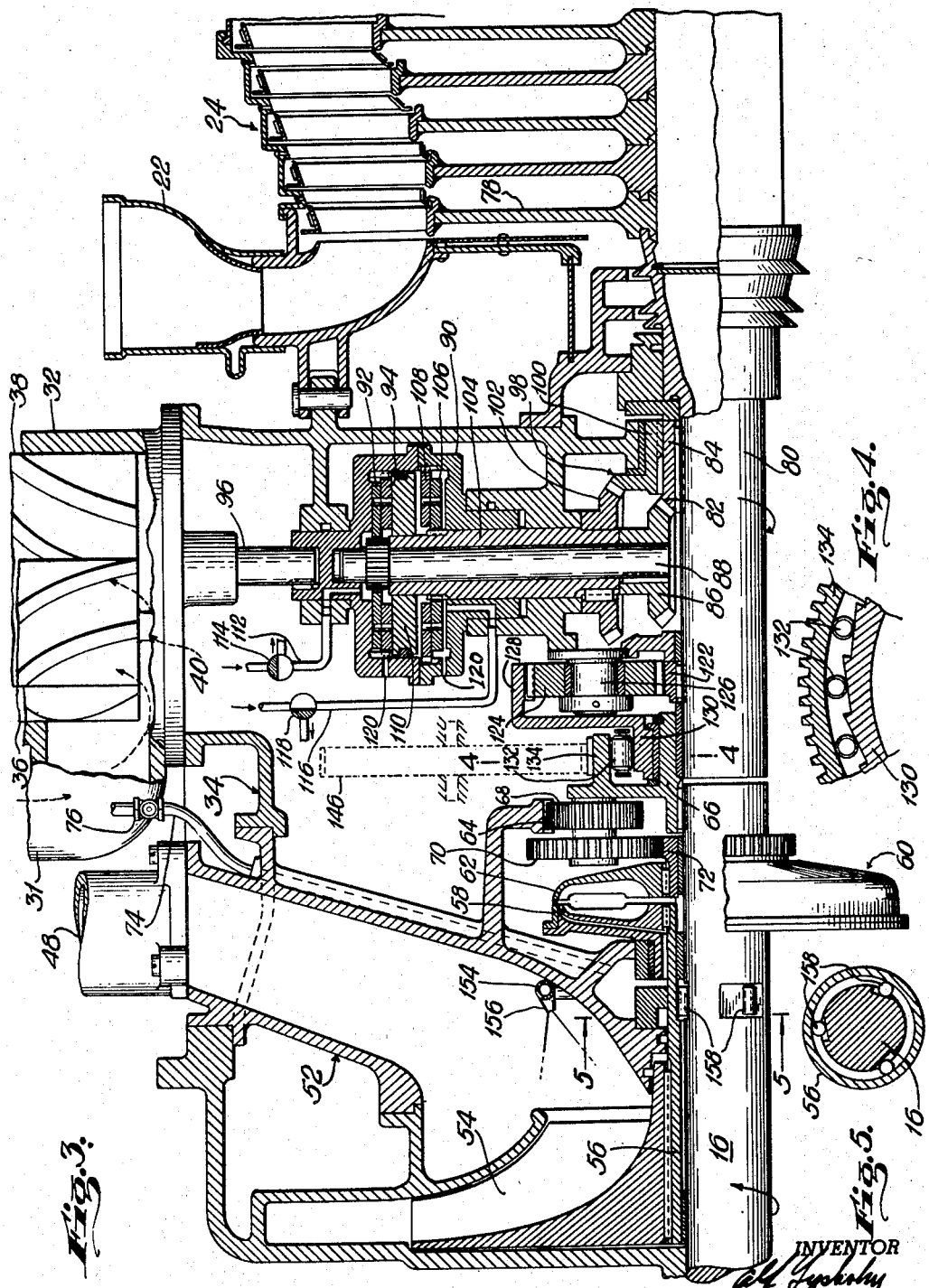

Patented July 6, 1948

2,444,456

UNITED STATES PATENT OFFICE 2,444,456

SUPERCHARGING SYSTEM FOR INTERNAL-COMBUSTION ENGINES

Alf Lysholm, Stockholm, Sweden, assignor, by mesne assignments, to Jarvis C. Marble, New York, N. Y., Leslie M. Merrill, Westfield, N. J., and Percy H. Batten, Racine, Wis., as trustees Application August 19, 1943, Serial No. 499,218

22 Claims. (Cl. 60—13)

The present invention relates to supercharging systems for internal combustion engines. More particularly the invention relates to such systems embodying an exhaust gas turbine driven supercharging compressor or blower, and still more particularly the invention relates to such systems for aircraft engines intended to operate up to very high altitudes.

The general object of the invention is to provide an improved supercharging system which will, among other things, as hereinafter more fully explained, operate to eliminate the difficulties and shortcomings of supercharging systems as now applied to aircraft engines and which will further operate to enable improved performance to be obtained from the engine with increased power available for takeoff at ground level, with additional power made available for full load operation at high altitudes without additional fuel consumption and with very substantial fuel saving at cruising speed throughout the altitude range of normal flight, all without sacrifice of normal performance characteristics of the power plant.

For the attainment of the above generally stated object and other and more detailed objects which will hereinafter appear, the invention contemplates the provision of a supercharging system, a fundamental characteristic of which is the employment of at least two serially connected compressors, the low pressure compressor of the system being of the positive displacement type and further being driven by an exhaust gas turbine, while the compressor effecting the final compression before delivery to the engine is engine driven and of the dynamic type, preferably centrifugal.

Aircraft engine superchargers now in use are limited substantially entirely to centrifugal types which are either engine driven or exhaust gas turbine driven, the latter type being employed extensively for high altitude operation. Experience has demonstrated that the inherent characteristics of the dynamic type of compressor, particularly the centrifugal form, make it in many ways unsuitable for supercharging purposes which require that the supercharger be operated under widely varying conditions of both speed and load. While this is recognized, this type of supercharger, in spite of its shortcomings, has proved to be the best solution heretofore available, particularly when weight and space limitations are taken into consideration.

The reason why the dynamic type of supercharger is basically unsuited for variable speed, variable load operation is that the efficiency drops off comparatively very rapidly from the speed at which optimum efficiency is obtained, and because of this the variable speed operation required for a supercharger results in the compressor being required to be operated much of the time at relatively low efficiency. Moreover, supercharger operation often imposes relatively rapid changes of considerable magnitude in speed of operation but even more frequently requires rapid change of considerable magnitude of a throttle control required to govern the output of the supercharger. When such conditions occur, it is difficult, if not impossible, to maintain steady flow of air to the engine. The net result is a marked tendency, which is difficult and at times impossible to overcome, for the system to produce surging or "pumping" with serious and sometimes disastrous results in the operation of the engine. This tendency to surge with sudden changes in operating conditions is particularly serious in the case of exhaust gas turbine driven dynamic compressors since, for example, sudden opening of the throttle to suddenly increase the output of a throttled engine may throw the supercharging system into surging of such magnitude that it is reflected in the amount of exhaust gas available for operation of the supercharger turbine and in extreme cases it may result in operational failure of the turbocompressor unit.

In accordance with the present system which, among other things, contemplates the utilization as a compressor of the high pressure dynamic supercharger only under certain conditions of operation, the above noted difficulty is eliminated because of the non-surging characteristics of the positive displacement turbine driven compressor that is employed. In the present system a relatively constant supply of air, the quantity of which is roughly proportionate to the speed of operation of the exhaust turbine, is available at the inlet of the dynamic compressor and the dynamic compressor furthermore delivers to what is in effect a closed system, the volume of which is represented by the volume of the manifold system of the engine, from which air is withdrawn at a relatively constant rate determined by the speed of operation of the engine. Thus, with this arrangement, if the operating conditions are such that both superchargers are in operation and a relatively sudden change in operating conditions occurs that tends to throw the dynamic supercharger into a surging condition, any incipient surging is relatively rapidly damped out in that part of the system between the outlet of the non-surging positive displacement compressor and the inlet valves of the engine cylinders.

As noted above, the present system contemplates use of the dynamic compressor only under certain conditions of operation, and in order more readily to visualize the general nature of the operation contemplated for the system, it is useful to consider the low pressure positive displacement turbine driven compressor as having primarily the function of compensating for differences in air density with differences in altitude, so as to provide at the discharge from the positive displacement compressor air at ground level pressure or with a certain degree of supercharge or "boost" at all times. On the other hand, the primary function of the dynamic supercharger is to provide all or a major portion of whatever boost above ground level pressure may be required for the desired operation of the engine. Thus, the dynamic engine driven supercharger is utilized as a device to provide boost only under high load conditions of operation when in flight.

To this end the system contemplates the employment of suitable controls for the different units, the detailed nature of which will hereinafter be more fully explained, these controls, however, including means such as a coupling or a variable speed drive for selectively rendering the dynamic supercharger either completely inoperative or operative only at such low speed as to effect no material boost, and also preferably including means such as a two-speed gearing for selectively operating the turbine driven positive displacement compressor at different speeds relative to turbine speed. The system further contemplates in its preferred form a plurality of separate compressor units operating in parallel and constituting the positive displacement, with intercoolers between the positive displacement and dynamic superchargers.

For a better understanding of the more detailed nature of the invention and the advantages to be derived from its use, reference may best be had to the ensuing portion of this specification, in conjunction with the accompanying drawings, in which is described by way of example but without limitation, one suitable form of apparatus for carrying the invention into effect.

In the drawings:

Fig. 3 is a longitudinal central section on enlarged scale of part of the structure of Fig. 1;

Fig. 4 is a section taken on the line 4—4 of Fig. 3 showing a portion of a one-way clutch included in the structure of Fig. 3; and Fig. 5 is a section taken on the line 5—5 of Fig. 3 showing a second one-way clutch in the embodied structure of Fig. 3.

Figure 1:
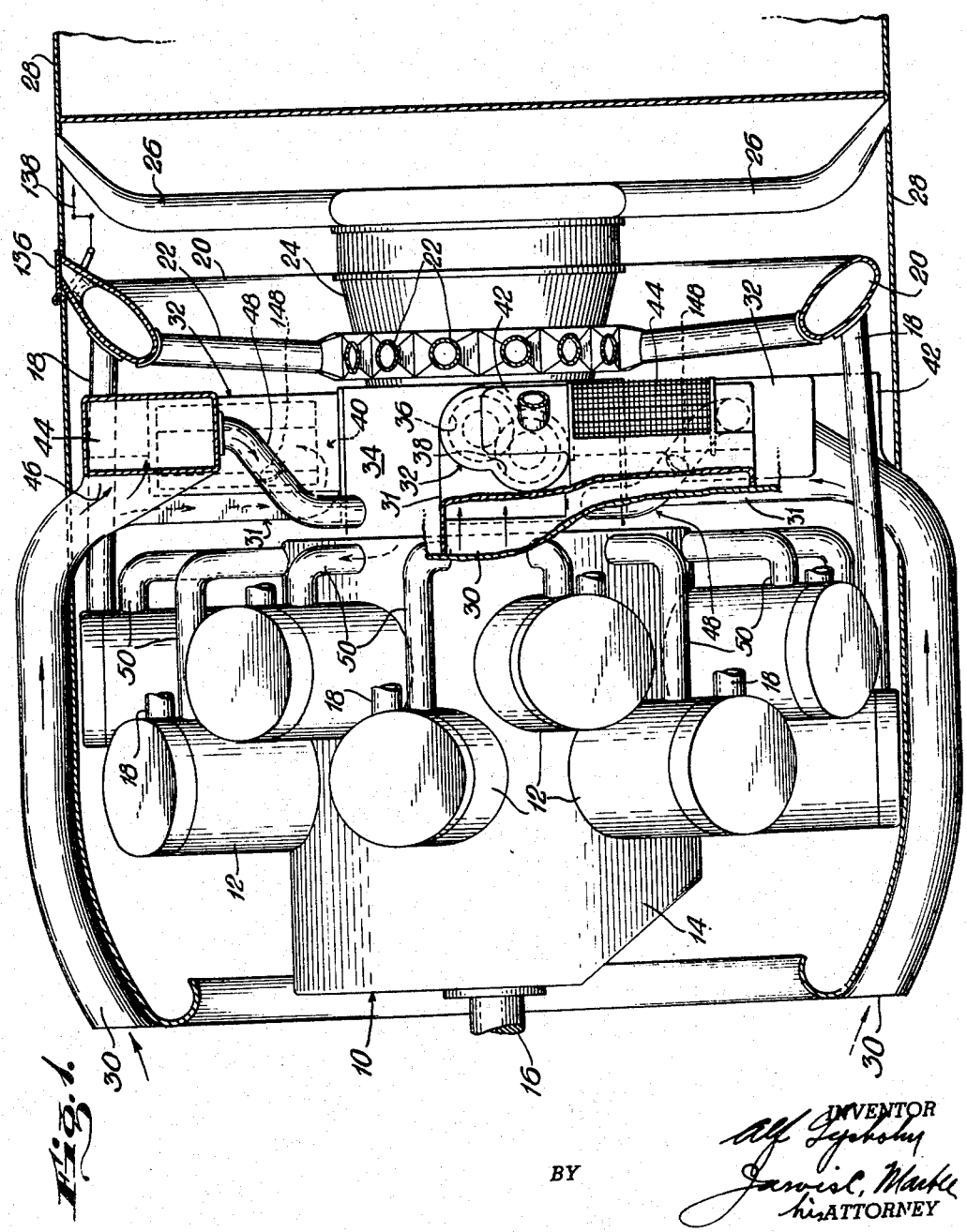
Fig. 1 is a diagrammatic plan view, partly in section and with certain parts broken away, of a power plant embodying the invention.
Figure 2:
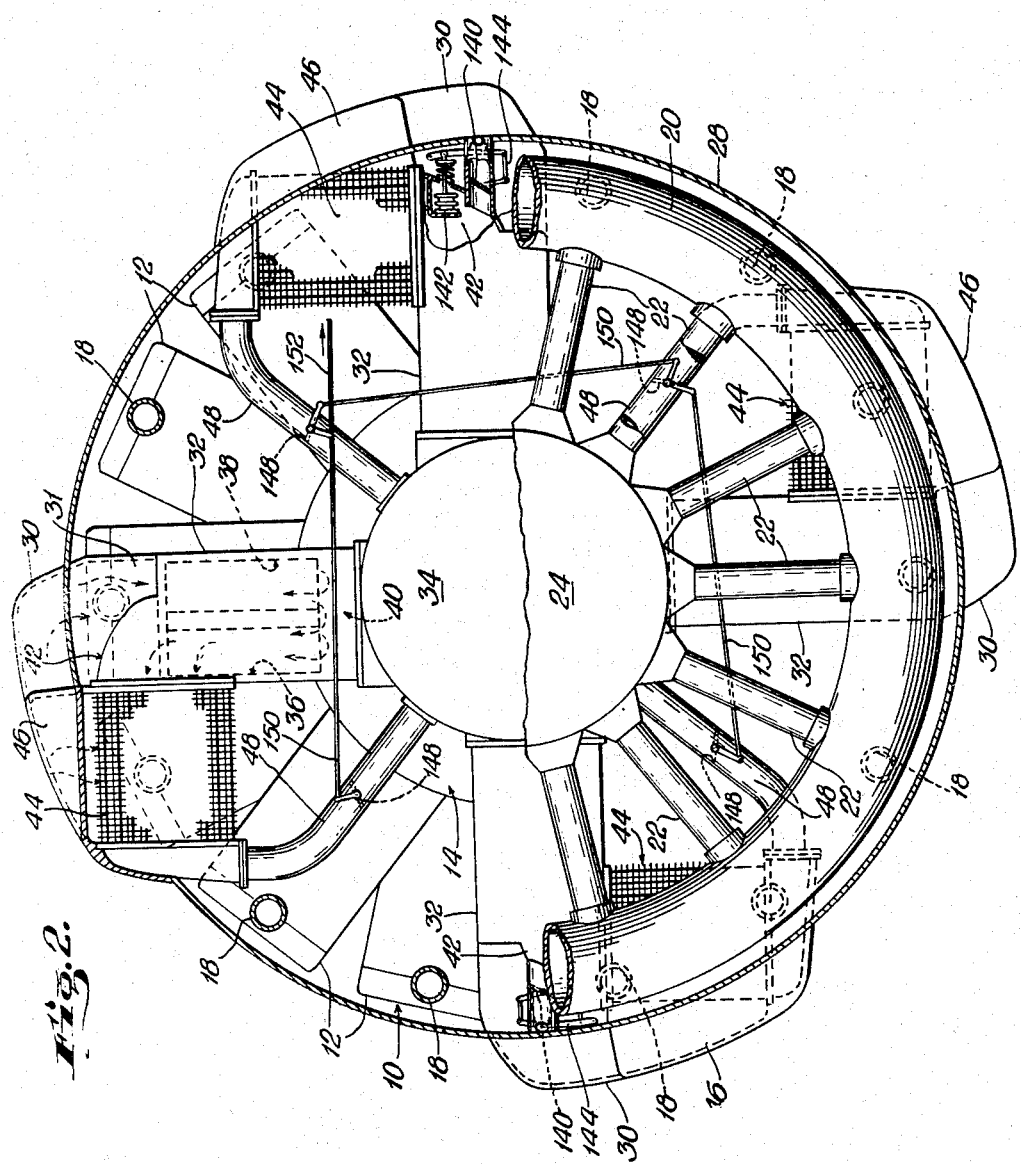
Fig. 2 is a transverse view looking from the right of Fig. 1, parts again being broken away for clearness.

Referring now more particularly to Figs. 1 and 2 of the drawings, the main internal combustion engine is indicated generally at 10, the type indicated being of the double row radial, having cylinders 12 secured to the usual crank and gear case 14, the main drive shaft of the engine being indicated at 16. The exhaust pipes from the several cylinders 12, which are indicated at 18 in Fig. 1, lead to a main exhaust manifold ring 20 from which a series of radially extending pipes 22 deliver the exhaust gas to the inlet of an exhaust gas turbine indicated generally at 24. The exhaust gases discharged from the turbine are exhausted through a number of exhaust gas ducts 26, which as shown in Fig. 1 are preferably carried outwardly to discharge the exhaust gases rearwardly to atmosphere through the usual cowling structure, indicated generally at 28, which encircles the power plant.

Combustion air for the engine is inducted through a plurality of air scoops 30, which deliver air to the inlet ends of a series of radially arranged positive displacement rotary compressors indicated at 32 and carried by a gear case housing 34 secured to the crank case of the engine and in turn supporting the turbine housing 24. In the example illustrated four of these compressors are employed but this number may be varied. Preferably the compressors are of the radial screw wheel type, of the kind disclosed in my prior Patents 2,174,522 and 2,243,874 granted October 3, 1939, and June 3, 1941, respectively. This kind of compressor has been more or less diagrammatically indicated and consists of intermeshing spirally grooved rotors 36 and 38 providing, with the casing, compression space of variable volume which register successively with a casing inlet port at one end of the rotors and an outlet port at the opposite end. The air flow through this type of compressor is generally axial and in the arrangement shown the combustion air is led from the scoops 30 through branch conduits 31 to the compressor inlets 40 at the radially inner ends of the compressors. The compressed air is delivered from the radially outer ends of the compressors through ducts 42 to a series of intercoolers 44 which in the example illustrated have been shown as tubular surface type heat exchangers. The compressed air passes through the tubes of these heat exchangers and the air for effecting cooling is admitted through the branches 46 leading from the air scoops 30. The cooling air for the intercoolers passes around the air tubes and is discharged directly to the space within the cowling behind the intercoolers.

From the intercoolers, the air is led through the connecting pipes 48 to the inlet of the high pressure dynamic compressor located within the housing 34, the latter compressor delivering the finally compressed combustion air through the inlet pipes 50 to the engine cylinders.

Referring now more particularly to Fig. 3, the dynamic compressor, indicated generally at 52, comprises a centrifugal rotor 54 secured to a sleeve 56 around the main engine shaft 16, sleeve 56 being secured to the turbine or driven element 58 of a hydraulic coupling 60, the driving or pump wheel member 62 of which is connected to the main engine shaft 16 by means of a planetary type step-up gearing consisting of a stationary ring gear 64, a rotatably mounted planet gear carrier 66 keyed to the engine shaft, planets 68 meshing with the stationary ring gear 64 and planets 70 meshing with a sun gear 72 fixed to the pump member 62 of the coupling. For controlling the drive to the dynamic compressor the coupling is indicated as being of the type in which the working chamber may be filled or evacuated. In the example shown, this is more or less diagrammatically indicated as being accomplished by means of a filling and evacuating pipe 74 controlled by means of a suitable control valve 76. In so far as the broader aspects of this invention are concerned the specific type of drive for the dynamic compressor is not critical, equivalent types of drives permitting the dynamic compressor drive to be disconnected and preferably also being of a type permitting variable speed drive to this compressor being useful in lieu of the hydraulic coupling.

The rotor 78 of the exhaust gas turbine is carried by a turbine shaft 80 which is in alignment with the main engine shaft 16 and selective two-speed drives for the positive displacement compressors 38 are provided. For effecting low speed drive to the compressors, a bevel gear 82, carried by sleeve 84 keyed to the turbine shaft 80, meshes with a series of gears 86, one of which is shown in Fig. 3. Since all of the individual drives to the low pressure compressors are alike, it will be sufficient to describe one. Gear 86 is keyed to shaft 88 which is enclosed in a clutch housing 90. A driving clutch plate 92 in housing 90 is splined for axial movement on shaft 88 and a driven clutch plate 94 is internally splined in the casing to have axial movement therein. The casing 90 is keyed to the drive shaft 96 connected to one of the rotors of the compressor. Assuming the clutch plates 92 and 94 to be engaged it will be apparent that the drive from the turbine to the compressor will be through the bevel gearing 82, 86, shaft 88, clutch plates 92, 94, housing 90 and shaft 96 to the turbine rotor. The gear ratio of gears 82, 86 is advantageously in the neighborhood of 1:1.

For high speed drive, a bevel gear 98 is mounted on sleeve 100 splined on sleeve 84 and thus driven by the turbine shaft. Gear 98 meshes with a gear 102 keyed to sleeve 104 around shaft 88, the gear ratio between gears 98 and 102 is advantageously in the neighborhood of 1.5:1. Sleeve 104 has a driving clutch plate 106 splined thereon which is located to engage a second driven clutch plate 108 internally splined to the casing 90. Between the driven clutch plates 94 and 108 a piston 110 is slidably mounted on sleeve 104 and as will be observed from the drawing, movement of this piston up or down will serve to alternatively engage either the clutch plates 92 and 94 or the clutch plates 106 and 108. Piston 110 is shifted hydraulically, pressure fluid being admitted through conduit 112 under control of valve 114 to the casing above the clutch plates 92 and 94 or through conduit 116 under control of valve 118 to the space below the clutch plates 106 and 108. Sufficient space for flow of the pressure fluid from its place of admission to the appropriate face of the piston 110 will ordinarily be afforded by the splined connection between the casing and the clutch plates, but if desired the clutch plates may in addition be perforated to permit free flow of the pressure fluid therethrough. The usual pressure fluid for actuating the clutch is oil under pressure from the lubricating system of the power plant and in order to permit the piston to be shifted from one position to the other, small vent holes 120 are provided in casing 90. Thus, whenever the clutch is in operation there is a small leakage of oil from the clutch casing but this is immaterial since this oil leaks into the gear case 34 from which it may be returned to the sump of the lubricating system. By proper manipulation of the hydraulic system controlling piston 110, the clutches for both high and low speed drives may simultaneously be disengaged.

Under certain operating conditions, the exhaust gas turbine may provide mechanical power in excess of that required to operate the low pressure compressors and in the arrangement shown this excess power is fed back to the main engine by means of a step down feed back gear. In the embodiment illustrated, this gear is of planetary form comprising a sun gear 122 keyed to the turbine shaft 80 and meshing with pinions 124 carried by the rotational stationary carrier 126. Pinions 124 mesh with a ring gear member 128, the portion 130 of which provides the inner race of a free wheel clutch having rollers 132. The outer race 134 of this clutch is formed as a part of the planet carrier 66 of the step-up gear for driving the coupling 60 and as previously noted this planet carrier is keyed to the main engine shaft 16. Thus, whenever the exhaust gas turbine tends to rotate the ring gear member 128 faster than the engine, power will be fed back to the engine through the free wheel clutch, while at times when the turbine is operating at a lower speed, the free wheel clutch will disconnect the two units.

As hereinafter explained, certain conditions of operation require that less than all of the available exhaust gas from the engine be delivered to the turbine, and the exhaust manifold ring 20 is accordingly provided with one or more waste gates 136, operated by suitable controls 138. Also, under certain conditions, the boost pressure may temporarily exceed the maximum permissible and to take care of such a condition one or more air waste gates 140 are provided. These gates can be manually controlled but are preferably automatically opened when the pressure between the discharge side of the low pressure supercharger and the engine throttle exceeds a predetermined limit, this advantageously being effected by the action of an evacuated barometric type bellows 142 located in the air conduit and connected to the gate through a suitable linkage 144.

Both air and exhaust gas are vented through the waste gates at appreciable pressure and the discharge passages are therefore directed rearwardly and shaped to convert the pressure drop to atmospheric pressure into velocity energy. Thus, particularly at high altitudes, appreciable rocket propulsion effect is obtained from the vented air or gas. For the same reason the outlet ends of the exhaust pipes from the turbine are directed and shaped to discharge gas rearwardly at accelerated velocity.

In order to achieve compactness of the entire installation, the carrier 66 provides an advantageous place from which to take off power for the driving of engine auxiliaries such as magnetos and the like which can be located between the radially extending low pressure compressor units, and an auxiliary power take off gear has been indicated by dotted lines at 146 for this purpose.

In order most easily to understand the nature of the operation of the system embodying this invention and the advantages to be derived from such operation, it is best to consider a specific example based on assumptions reasonably applicable to a present day aircraft power plant. Therefore, for the purposes of the ensuing discussion it will be assumed that the engine is one capable of delivering around 1,700 H. P. at full throttle and with a manifold pressure of 45 inches of mercury absolute. For an engine of this size, the necessary quantity of combustion air for full throttle operation can be supplied by four positive displacement compressors of the kind hereinbefore mentioned, having rotors of approximately 6 inches in diameter by about 12 inches in length, operating at take off at a speed of approximately 6,000 R. P. M. This number and size of compressors will also furnish the necessary quantity of air for full throttle operation at 30,000 feet elevation when operated at 15,000 R. P. M.

If it is now assumed that it is desired to take off at sea level, this will, of course, require full throttle operation of the engine and in accordance with the principles of the present invention the dynamic supercharger is disconnected or operated at a speed so low as to not effect any material boost. Supercharging under this condition is done entirely with the positive displacement low pressure supercharger, which because of the relative density of the air at low altitude, has ample capacity in low gear to provide the required quantity of air with the exhaust turbine operating at much less than maximum speed and with much less than the amount of exhaust gas available from the engine at takeoff. Under these conditions, the amount of energy delivered by the turbine and the quantity of air compressed for supercharging the engine is controlled by the operator through control of the exhaust gas waste gate 136 which is opened to by-pass directly to atmosphere the excess amount of exhaust gas. The use of the exhaust gas waste gate control is highly advantageous from the standpoint of the severity of the conditions imposed on the exhaust gas turbine at takeoff, since exhaust gas temperatures at takeoff are materially higher than normal and reduction in the quantity of gas flow to the turbine results in materially lower combined temperature and mechanical stress on the blading since the turbine will be operating at well under maximum speed. Since as noted above, the requisite weight of air can be supplied at takeoff at relatively low compressor speeds, the compressor drives are under this condition adjusted for low speed drive when two-speed gearing is used.

With the system operating as described, a material advantage is gained in the power output possible to obtain from the engine as compared with ordinary supercharging systems, since the air being delivered to the engine flows through the intercoolers after leaving the low pressure supercharger. In these, the air is cooled by the air stream set up by the propeller blast even though the plane is not moving, to the cooling effect of which there is also added the natural radiating capacity of the intercoolers. The cool air, since it is not again heated by further compression in the dynamic supercharger, reaches the engine cylinders at lower temperature and greater density than would otherwise be the case and consequently, maximum volumetric capacity of the engine in terms of weight of charge inducted is obtained. Such being the case, maximum takeoff power is obtainable, which is not obtainable with an engine in which a charge carrying the heat of compression from a supercharger is delivered to the engine cylinders.

After takeoff, as the aircraft gains altitude, the control of the supercharging system continues to be effected through control of the exhaust gas waste gate, this being progressively closed as altitude increases so as to speed up the exhaust gas turbine and the low pressure supercharger. This increases the rate at which the low pressure supercharger delivers air and due to this increase the manifold pressure can be maintained at desired level in spite of the increasing rarification of the atmospheric air.

In an installation which is designed for operation at a critical altitude (that is, the maximum altitude at which maximum boost pressure can be maintained in the engine manifold at full throttle) of say 30,000 feet, the waste gate will ordinarily be fully closed at around 10,000 feet altitude in order to provide the desired input to the engine with the low pressure supercharger running alone in low speed gear.

With the waste gate closed at 10,000 feet altitude, the exhaust gas turbine, provided that it is an efficient unit, will generate surplus power, this largely being due to the decreased back pressure against which the turbine must exhaust and the consequently greater heat drop through the turbine, it being remembered that due to the supercharging of the engine, the pressure of the engine exhaust gases remains substantially constant.

This surplus power is reflected in an increase in the speed of operation of the turbine and when the turbine reaches a speed related to the engine shaft speed as determined by the gearing between the turbine and engine shafts, the freewheel clutch engages and surplus power from the turbine is fed back to the main engine. This increase in turbine speed, with the exhaust waste gate closed, also results in increasing speed of operation of the low pressure supercharger and this increase may result in the production of a boost pressure higher than that which is permissible. In order to avoid this possibility, the air waste gates 140 come into action.

As altitude increases above the level at which the exhaust gas waste gate is advantageously first closed, a point is reached when even with the utilization in the turbine of all of the available exhaust gases, the low pressure supercharger, operating with the low speed gearing in action, will be unable to supply a sufficient quantity of air to maintain full boost pressure and when this condition is reached, and as altitude further progressively increases, the several low pressure compressor units are progressively shifted from low speed drive to high speed drive. By having the low pressure supercharger divided into a number of units the speed of which can be individually controlled, a very much closer control of the power taken out of the turbine for supercharging purposes can be maintained than with a single unit. Thus, by changing the quantity delivered by the low pressure supercharger by relatively small increments, the waste of energy absorbed by excess supercharging which must be lost through an air waste gate is avoided.

When higher altitude is reached, as for example, 20,000 feet, the compression ratio from atmospheric pressure at that altitude to the desired boost pressure for admission to the engine at maximum boost becomes too great to be efficiently effected by the positive displacement rotary type compressor. At 20,000 feet altitude the atmospheric correction factor is 2.2 and if a manifold pressure of 45 inches mercury is desired to be maintained, the overall compression ratio required is 3.3. When this condition obtains the dynamic compressor is then advantageously brought into action to provide additional boost, so that the low pressure supercharger has preferably to operate only at a compression ratio which will provide an intermediate pressure approximating ground level pressure. In this connection, however, it is to be noted that if cruising at 20,000 feet with the engine operating at say 30 inches manifold pressure, the low pressure supercharger can operate efficiently at the required compression ratio of approximately 2.2 to 1 and the dynamic supercharger may be permitted to remain idle. Thus, when cruising at such an altitude, all supercharging power may be derived from the exhaust gases. Also, due to the decreased back pressure on the turbine at this altitude, substantial surplus power above that required to drive the supercharger is available for feed back to the engine.

As altitude increases above the 20,000 foot level and up to the assumed critical altitude of 30,000 feet, the amount of power which can be extracted from the exhaust gases becomes increasingly greater due to the progressively decreasing turbine back pressure. With an efficient turbine this increase is so marked that with the low pressure compressors operating at maximum speed and consequently at full capacity, so that if higher altitude is attained the boost pressure must necessarily fall off, the turbine will develop a very substantial amount of power in excess of that required to drive the supercharger. The power absorbed from the engine by the dynamic supercharger under conditions of full load operation at critical altitude, will be only a fraction of the excess power that may be developed by the turbine and fed back to the main engine. Thus, with such an arrangement it is possible to secure a higher net power output from the power plant at critical altitude than at ground level. When cruising at critical altitude, when the dynamic compressor may be disconnected, highly efficient operation from the standpoint of fuel economy is attained because of the excess power obtainable from the exhaust gas turbine which may be fed back to the engine, this power, under such conditions being net gain since there is no power drain on the engine from the dynamic supercharger.

From the foregoing discussion, the manner of regulating the supercharging system when descending from high altitude to ground level will be largely evident. As the altitude decreases and air density increases, the low pressure compressor units are progressively shifted over from high speed to low speed drive and eventually when the lower altitudes are reached the exhaust gas waste gate control is brought into action. When landing, when the engine throttle is substantially closed to bring the engine to idling operation, there will, temporarily at least, be an excess of air delivered by the low pressure supercharger, this excess being discharged through the air waste gates.

The engine throttle control may be arranged in various ways, but preferably is by throttle means located on the inlet side of the dynamic compressor and in Fig. 2 such a throttle system is more or less diagrammatically indicated by the butterfly throttle valves 148 located in the pipes 48 leading from the intercoolers to the dynamic supercharger, these throttles being interconnected by suitable links 150 for operation from a master throttle control 152.

In order to achieve the most advantageous results from the use of a supercharging system such as that herein disclosed it is important that the exhaust gas turbine be of a highly efficient type capable of operating with a thermo-dynamic efficiency in the range of 80 to 85%. Such efficiency is obtainable as a practical matter by the use of a multiple stage reaction type turbine and in the example shown there has been illustrated more or less diagrammatically, a suitable form of such type of turbine having five expansion stages with full admission of the motive fluid to the turbine blading. With such a turbine, designed in accordance with known principles of turbine design, efficiencies of the order above mentioned are obtainable.

Also through the use of welded rotor construction and hollow blades, such as is disclosed and claimed in my copending application Serial No. 499,217 filed August 19, 1943, lightness of construction enabling a multi-stage turbine to be employed without involving undue weight is entirely possible.

While the utility of the supercharging system is not affected by the nature of the fuel supply to the engine, that is, by the use of carburetors or fuel pump and injector systems for either light or heavy fuel, the system is particularly well adapted for use when a carbureted mixture of air and volatile fuel is delivered to the engine. In such systems, it is common practice to supply the fuel to the air stream on the inlet side of a dynamic compressor such as herein shown, utilizing the rotor of the latter to assist in providing a homogeneous gas mixture to the engine and in the present instance there has been shown more or less diagrammatically a fuel supplying means for volatile fuel comprising a ring 154 connected to a suitable source of fuel supply (not shown) and provided with peripherally spaced jet nozzles, one of which is shown at 156, for directing fuel sprays into the air entering the dynamic supercharger. Where this type of fuel supply is employed and the fuel mixture passes through the rotor of the dynamic supercharger under all conditions of operation, it may be desirable, in order to make use of the fuel mixing properties of the rotor, to keep the latter in motion even when it is not utilized to provide any appreciable boost. To this end, a free wheel clutch having rollers 158 may be provided between the sleeve 56 and the engine drive shaft 16, this clutch being arranged so that it overruns whenever the dynamic supercharger is operated for supercharging purposes by filling the coupling 60, in which case, due to the gearing employed, the rotor of the supercharger operates at many times engine shaft speed. If such a free wheel clutch is employed, the dynamic supercharger rotor will always operate at a minimum speed equal to engine crankshaft speed. This, however, is so low that no appreciable boost is effected by the dynamic supercharger and moreover the amount of power required to turn the rotor at the relatively low engine speed is very small so that this freewheel clutch can safely be made very small and light.

While for the purpose of explaining the invention, I have shown diagrammatically one example of apparatus, it will readily be appreciated that many different arrangements of parts may be employed and many different specific forms of component parts may be used without departing from the invention, the scope of which is to be understood as embracing all forms of apparatus falling within the purview of the appended claims.

What is claimed is:

1. A supercharging system for internal combustion engines including a dynamic compressor for delivering air to the engine cylinders, a rotary positive displacement compressor for compressing atmospheric air to be supplied to the engine through said dynamic compressor, a turbine driven by engine exhaust gas for operating the positive displacement compressor and means for driving said dynamic compressor from the engine.

2. A supercharging system for internal combustion engines including a dynamic compressor for delivering air to the engine cylinders, a rotary positive displacement compressor for compressing atmospheric air to be supplied to the engine through said dynamic compressor, a turbine driven by engine exhaust gas for operating the positive displacement compressor and means for driving said dynamic compressor from the engine, said driving means including means for selectively controlling the speed of operation of said dynamic compressor relative to the engine.

3. A supercharging system for internal combustion engines including a dynamic compressor for delivering air to the engine cylinders, a rotary positive displacement compressor for compressing atmospheric air to be supplied to the engine through said dynamic compressor, a turbine driven by engine exhaust gas for operating the positive displacement compressor and driving means for driving said dynamic compressor from the engine, said driving means including means for selectively rendering said dynamic compressor ineffective to materially increase the pressure and temperature of the air passing therethrough to the engine.

4. A supercharging system for internal combustion engines including a dynamic compressor for delivering air to the engine cylinders, a rotary positive displacement compressor for compressing atmospheric air for delivery through said dynamic compressor to the engine, an exhaust gas driven turbine for driving said positive displacement compressor, means for intercooling the compressed air delivered by said positive displacement compressor before admission thereto to said dynamic compressor and means for driving the dynamic compressor from said engine, said means including means selectively operable to render the dynamic compressor ineffective to materially increase the pressure and temperature of the air passing therethrough.

5. A supercharging system for an internal combustion engine including a dynamic supercharger, means for driving said supercharger from the engine including a releasable coupling, a positive displacement compressor for compressing atmospheric air for delivery to said dynamic compressor, means for intercooling air delivered by said positive displacement compressor before admission thereof to said dynamic compressor, a turbine driven by exhaust gas from the engine and driving means between said turbine and the positive displacement compressor for selectively driving the latter at different speeds relative to the speed of the turbine.

6. A supercharging system for internal combustion engines including an engine driven dynamic compressor for delivering compressed air to the engine cylinders, an exhaust gas turbine driven rotary positive displacement compressor for compressing atmospheric air for delivery to said dynamic compressor and one-way clutch means between said turbine and the engine for transmitting power from the turbine to the engine when the power generated by the turbine is in excess of that required to drive said positive displacement compressor.

7. A supercharging system for internal combustion aircraft engines including an engine driven dynamic compressor, an exhaust gas turbine driven rotary positive displacement compressor for compressing atmospheric air, conduit means for delivering air from the positive displacement compressor to the dynamic compressor and control means operable to bleed air from said conduit means to limit the absolute pressure therein.

8. A system as set forth in claim 7 in which said control means includes a barometric pressure responsive device for actuating the control.

9. A system as set forth in claim 7 in which the means for bleeding air from the conduit system includes velocity accelerating nozzle means for directing the air bled from the system rearwardly of the direction of flight to provide a rocket propulsion effect therefrom.

10. A supercharging system for internal combustion aircraft engines including an engine driven dynamic compressor for delivering air to the engine cylinders, an exhaust gas turbine driven rotary positive displacement compressor for compressing atmospheric air for delivery to said dynamic compressor and control means selectively operable to vary at will the effective pressure drop through said exhaust gas driven turbine.

11. A supercharging system for internal combustion engines including an engine driven dynamic compressor for delivering air to the engine cylinders, an exhaust gas turbine driven rotary positive displacement compressor for compressing atmospheric air, conduit means for delivering air from said positive displacement compressor to said dynamic compressor, means operable to bleed a controlled amount of air from said conduit means, and throttle means located between the air bleeding means and the inlet to the engine cylinders for controlling the quantity of air delivered to the engine.

12. A supercharging system for internal combustion engines including an engine driven dynamic compressor for delivering air to the engine cylinders, an exhaust gas turbine, a plurality of positive displacement compressors for compressing atmospheric air, driving means for separately driving each of said positive displacement compressors from said turbine, said driving means including means selectively operable to drive the compressors at different speeds relative to the turbine speed, and means for conducting air delivered by said positive displacement compressors to said dynamic compressor.

13. A supercharging system for internal combustion engines including an engine driven dynamic compressor for delivering air to the engine cylinders, an exhaust gas turbine, a plurality of positive displacement compressors for compressing atmospheric air, driving means for separately driving each of said positive displacement compressors from said turbine, said driving means including a releasable coupling for selectively rendering one or more of said positive displacement compressors inoperative, and means for conducting air delivered by said positive displacement compressors to said dynamic compressor.

14. A supercharging system for internal combustion engines including an engine driven dynamic compressor for delivering air to the engine cylinders, an exhaust gas turbine, a plurality of positive displacement compressors for compressing atmospheric air, driving means for separately driving each of said positive displacement compressors from said turbine, said driving means including a releasable coupling and gearing for selectively driving one or more of said positive displacement compressors at different speeds relative to the turbine speeds or for rendering the same inoperative, and means for conducting air delivered by said positive displacement compressors to said dynamic compressor.

15. A supercharging system for internal combustion engines including an engine driven dynamic compressor for delivering air to the engine cylinders, an exhaust gas turbine driven rotary positive displacement compressor for compressing atmospheric air, conduit means for delivering air from said positive displacement compressor to said dynamic compressor, throttle means on the inlet side of said dynamic compressor for governing the quantity of air delivered to the engine cylinders, air bleeding means located between the outlet side of said positive displacement compressor and said throttle means and waste gate means for controlling the quantity of exhaust gas delivered to said turbine.

16. A supercharging system for internal combustion engines including an engine driven dynamic compressor for delivering air to the engine, means for delivering fuel to the air on the inlet side of said compressor whereby to utilize the compressor to aid in forming a homogeneous fuel mixture for delivery to the engine, an exhaust gas turbine driven positive displacement compressor for compressing atmospheric air and delivering it to the inlet side of said dynamic compressor, driving means driven by said engine for operating said dynamic compressor at a speed substantially higher than engine speed, means for selectively rendering said driving means inoperative, and a one-way clutch operable to drive said dynamic compressor at engine speed when said driving means is rendered inoperative.

17. A supercharging system for an internal combustion engine comprising an exhaust gas turbine located in line with the engine, a plurality of positive displacement rotary compressors transversely disposed between the turbine and the engine, gearing for driving each of said compressors from said turbine, said turbine and said compressors being located within the area corresponding to the frontal area of the engine, and power transmission means for feed-back of power from the turbine to the engine when the turbine speed tends to increase above a predetermined value relative to engine speed.

18. A supercharging system for internal combustion engines, comprising an exhaust gas turbine having a shaft mounted in alignment with the main engine shaft, a plurality of radially arranged positive displacement rotary compressors, multiple speed gearing for driving each of said compressors from said turbine shaft, and means including a step-down gear and a one-way clutch for connecting said turbine shaft and said main engine shaft, said one-way clutch being arranged to transmit power from the turbine to the engine when the turbine speed tends to increase above a predetermined value relative to engine speed.

19. A supercharging system for internal combustion engines comprising an axially mounted exhaust gas turbine, a plurality of radially arranged positive displacement rotary compressors, multiple speed gearing for driving each of said compressors from said turbine, a plurality of surface type coolers located in spaces between said radially arranged compressors, means for supplying air to the compressors, means for conducting compressed air from the compressors to the coolers and means for conducting the cooled air from the coolers to the induction system of the engine.

20. A system as set forth in claim 19 in which the multiple speed gearing includes means for selectively operating each of the compressors independently at selected speed relative to the speed of the turbine.

21. A system as set forth in claim 19 in which the multiple speed gearing includes means for selectively operating individual compressors at selected speed relative to the turbine and for selectively rendering individual compressors inoperative.

22. A supercharged radial internal combustion engine power plant comprising an internal combustion engine having radially arranged air cooled cylinders, a cowling for said engine extending rearwardly therefrom, an axially arranged exhaust gas turbine located in said cowling behind the engine, a plurality of radially arranged positive displacement rotary compressors located in said cowling between the turbine and the engine, a plurality of surface type air coolers located substantially within the cowling and in the spaces between said compressors, a centrally located gear box located between the turbine and the engine, said gear box comprising gearing providing independent multiple speed drives to each of said compressors and gearing including a one-way clutch for transmitting power from the turbine to the engine when the turbine speed tends to increase above a predetermined value relative to engine speed, means for admitting air from outside said cowling which has not passed over said engine cylinders to said compressors and to said coolers and means for conducting compressed air from the coolers to the induction system of the engine.

ALF LYSHOLM.

REFERENCES CITED

The following references are of record in the file of this patent:

UNITED STATES PATENTS

| Number | Name | Date |
| --- | --- | --- |
| 1,774,738 | Vought | Sept. 2, 1930 |
| 2,078,807 | Puffer | Apr. 27, 1937 |
| 2,197,179 | Hersey | Apr. 16, 1940 |
| 2,292,233 | Lysholm | Aug. 4, 1942 |
| 2,305,810 | Müller | Dec. 22, 1942 |
| 2,306,277 | Oswald | Dec. 22, 1942 |

FOREIGN PATENTS

| Number | Country | Date |
| --- | --- | --- |
| 2,083 | Great Britain | Jan. 29, 1908 |
| 206,845 | Great Britain | Feb. 21, 1924 |
| 244,032 | Great Britain | Mar. 18, 1926 |
| 480,236 | Great Britain | Feb. 18, 1938 |
| 505,268 | Great Britain | June 8, 1939 |
| 684,902 | France | Mar. 24, 1930 |
| 710,549 | France | June 8, 1931 |
| 435,928 | Germany | Oct. 20, 1926 |